(12) United States Patent
Wang

(10) Patent No.: US 6,895,517 B2
(45) Date of Patent: May 17, 2005

(54) METHOD OF SYNCHRONIZING OPERATION FREQUENCIES OF CPU AND SYSTEM RAM IN POWER MANAGEMENT PROCESS

(75) Inventor: Jing-Rung Wang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 622 days.

(21) Appl. No.: 10/053,309

(22) Filed: Jan. 16, 2002

(65) Prior Publication Data

US 2003/0041273 A1 Feb. 27, 2003

(30) Foreign Application Priority Data

Aug. 22, 2001 (TW) ........................................ 90120584 A

(51) Int. Cl.⁷ .............................................. G06F 1/28
(52) U.S. Cl. ...................................... 713/300; 713/300
(58) Field of Search ........................................ 713/300

(56) References Cited

U.S. PATENT DOCUMENTS 6,065,121 A * 5/2000 Hobson et al. ............. 713/300
6,266,776 B1 * 7/2001 Sakai ......................... 713/300
6,725,384 B1 * 4/2004 Lambino et al. ............ 713/320

* cited by examiner

Primary Examiner—John R. Cottingham
(74) Attorney, Agent, or Firm—J.C. Patents

(57) ABSTRACT

A control method of synchronizing operation frequencies of a CPU and a system RAM in a power management process. A power management process is initialized by a system interrupt generated by a power management event. After sending the interrupt control signal output from the chipset to the CPU, the CPU enters a system management mode to execute an interrupt service routine. The interrupt service routine irrelevant to the system RAM configuration is executed first. The shadow RAM control register of the chipset is programmed using the BIOS program to enable the BIOS ROM. A distant jump command is programmed to jump into a predetermined memory address of the BIOS ROM storing a system RAM frequency modulation program to execute the system RAM frequency program. Therefore, the operation frequencies of the CPU and the system RAM are consistent during the power management process to eliminate the instability of system caused thereby.

19 Claims, 6 Drawing Sheets

METHOD OF SYNCHRONIZING OPERATION FREQUENCIES OF CPU AND SYSTEM RAM IN POWER MANAGEMENT PROCESS

CROSS-REFERENCE TO RELATED APPLICATION

This application claims the priority benefit of Taiwan application serial no. 90120584, filed Aug. 22, 2001.

BACKGROUND OF THE INVENTION

1. Field of the Invention

The invention relates in general to a power management process in an advanced configuration power interface (ACPI) computer system, and more particularly, to a method of increasing system execution stability of the power management process by synchronizing the operation frequencies of system random access memory (RAM) and the central processing unit (CPU) while a executing power management process in the system management mode (SMM).

2. Description of the Related Art

Power management techniques such as the advance power management (APM) have been broadly applied to personal computers. For the current computer system, most of the system basic input/output systems (BIOS) and process systems provide functions to support power management. The power management process is performed via the BIOS program stored in the system read only memory (ROM). When a power management event or a power configuration event (such as a request to convert a "work" state into a "sleep" state) occurs to the legacy OS system, an interrupt of OS-transparent is generated to the power management event or power configuration. This is called system management interrupt (SMI). The BIOS receives the notice of interrupt event via the system management interrupt. While the event occurs, the BIOS communicates with the operating system to generate a system management interrupt to the CPU after the operating system acknowledges all the OS level device drivers, so as to transfer control to the system BIOS. The system BIOS is responsible for processing the required software state information and controlling the related hardware to complete the request. When the system wakes up by a wake-up event, the BIOS again receives notice from a system management interrupt. All the required resume operations of the hardware state information are executed before returning control to the operating system.

In the later ACPI computer system, when a power management event or a power state event occurs, an interrupt which has to be shareable and OS-visible is generally generated. This interrupt is called the system control interrupt (SCI). The operating system guides a power state change for the entire system and apparatus. Nowadays, the ACPI has become the key device for operating system directed configuration and power management (OSPM).

The ACPI comprises several listings, a BIOS and a hardware register. The ACPI listings (definition blocks) are used to describe the system state information and the control method. The ACPI BIOS is a part of the system firmware that completes the interfaces of specified listings, sleep, wake-up, and reset operations to store the permanent change of the ACPI tables. The ACPI register is to store and transmit the event information between the hardware, the firmware and the ACPI driving program. The ACPI driving program is an OS-level software program to coordinate the transaction between the working state and the sleeping state.

The ACPI specification defines a global working state G0, in which the host CPU can execute the BIOS command. Under such state, the peripheral apparatus can dynamically change the power state thereof The ACPI specification farther defines a global sleeping state G1. Under the state G1, the CPU does not execute any user mode thread. The G1 state comprises sleeping five states S1 to S5 for the computer system. In the S3 sleeping state (which is the called the STR state for the legacy AMP OS, and AMP is a short form of suspend to RAM), it defines that the power other than the one to reserve system memory is not existent. Before the system enters the sleeping state, the BIOS stores all the system hardware (including CPU, cache memory and chipset) configuration information and contexts into the system management RAM (SMRAM) of the system memory. Only the low voltage power (of about 5V) supplied to the system memory and the south bridge chipset is reserved. When a wake-up event is detected, the BIOS resumes all the hardware configuration and enables the hardware operation according to the information stored in the system management RAM.

However, while performing power management process, should inconsistency between the operation frequencies of the CPU and the system RAM occur, operations of the system RAM and the CPU cannot be synchronous. More seriously, the computer system may crash while performing power management process.

SUMMARY OF THE INVENTION

According to the power management process provided by the invention, a system RAM frequency modulation program is stored in a predetermined memory address of the BIOS ROM for the purpose of synchronizing the operation frequencies of the CPU and the system RAM in the power management process. When a power management event occurs, a system interrupt is generated to activate the BIOS program. The CPU is driven to enter the system management mode for operation. When the CPU enters the system management mode to operate, one of the memory address segments of the system RAM is provided as a SMRAM, of which the execution in the SMRAM is irrelevant to the interrupt service routine configured in the system RAM. The shadow RAM control register is programmed by the BIOS program, so that the BIOS ROM is enabled, and the program execution distantly jumps to the predetermined memory address storing the system RAM modulation program of the BIOS ROM. The system RAM modulation program is initiated.

When a wake-up event occurs, the BIOS starts executing power-on self test (POST) from the reset vector of the CPU. The hardware including CPU and chipset are thus set up, initiated and enabled. A system interrupt is then requested again to drive the CPU to enter the system management mode operation. In the system management mode, the BIOS drives the CPU to execute other required resume programs. After completing all the resume programs, the program execution jumps to the waking vector of the operating system, so as to return control to the operating system.

Both the foregoing general description and the following detailed description are exemplary and explanatory only and are not restrictive of the invention, as claimed.

DESCRIPTION OF THE PREFERRED EMBODIMENTS

Figure 1:
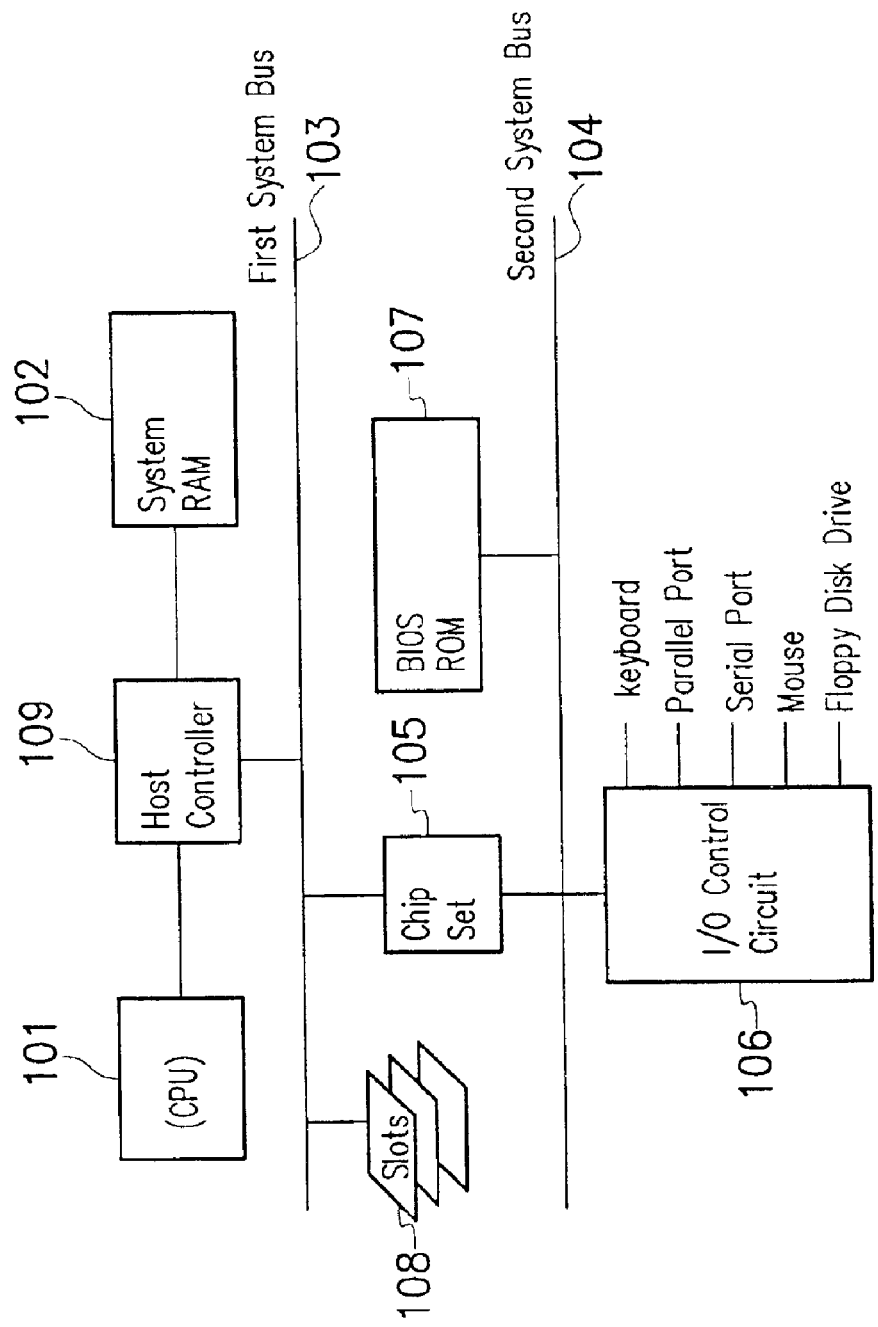
FIG. 1 shows a block diagram of a computer system.

Referring to FIG. 1, a block diagram of an ACPI computer system 1 is illustrated. The ACPI computer system 1 comprises at least a CPU 101, for example, an Intel Pentium processor or an AND Athlon processor, a system RAM 102, a chipset 105, a host controller 109 and a BIOS ROM 107. The ACPI computer system 1 has a bus system to provide a mutual connection and communication between various peripherals. The bus system of the computer system 1 includes a first system bus 103, preferably a peripheral component interconnect (PCI) bus and a second system bus 104, preferably an industrial standard architecture (ISA) or a low pin count (LPC). An I/O control circuit 106 able to provide an interface to communicate with a keyboard, a parallel port, a serial port, a mouse, a floppy drive and the system bus is further included. The ACPI computer system 1 further provides a plurality of system bus slots 108 into which the system bus peripheral such as a SCS1 control card is plugged. The host controller 109 is used to coordinate the data transmission between the CPU 101, the system RAM 102 and the first system bus 103. The BIOS ROM 107 stores the program command to initiate the computer and to activate and load the operating system. The chipset 105 has a bridge circuit (not shown) to couple the second system bus 104 to the first system bus 103. The chipset 105 further includes a chip enable circuit (not shown) controlled by the CPU 101 and able to output a ROM chip select signal ROMCS# to selectively enable and disable operation of the BIOS ROM 107. The BIOS ROM 107 includes a chip enable input pin (not shown in the related figures for the convenience of illustration) to receive the ROM chip enable signal to enable operation of the BIOS ROM 107, so as to enable the CPU 101 to read the information of the BIOS ROM 107.

Figure 2:
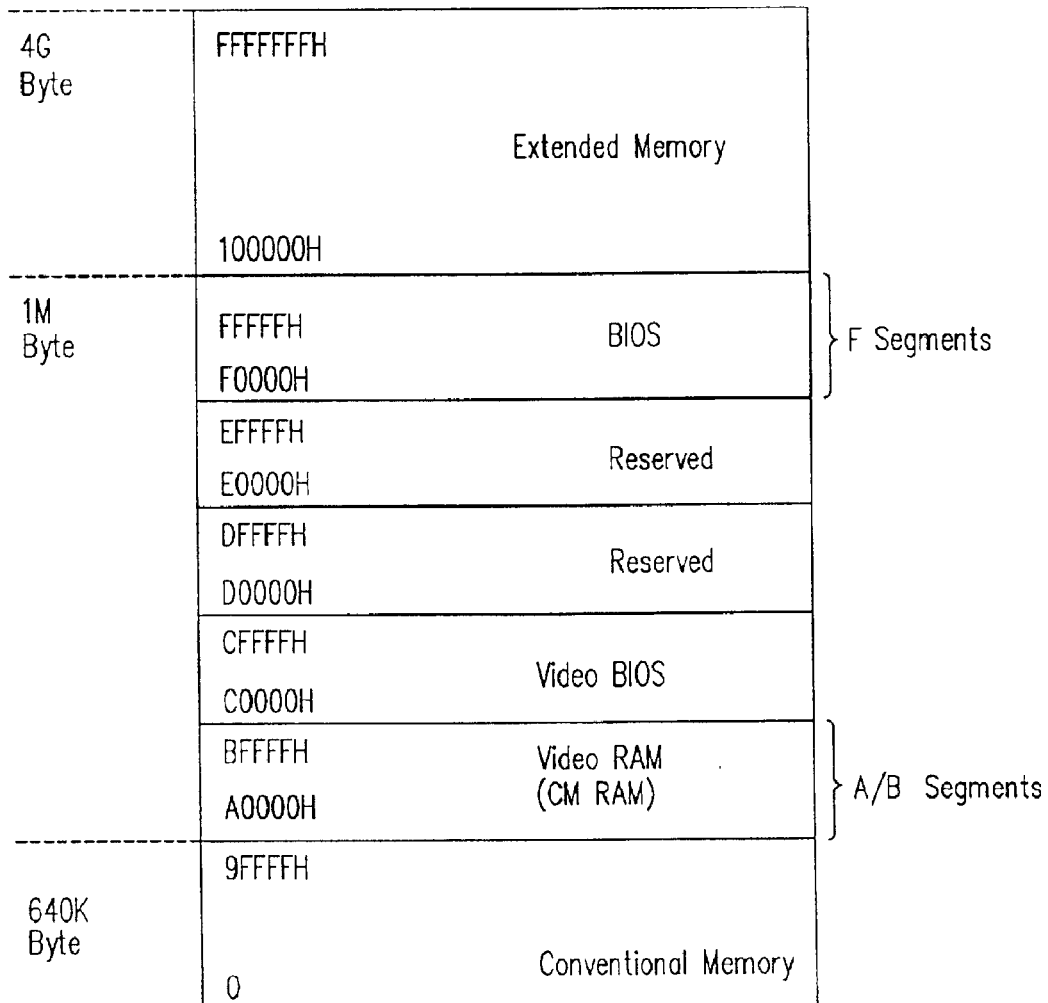
FIG. 2 shows a system address map of a computer system.

Referring to FIG. 2, a system address map of a computer system is illustrated. Conventionally, the memory address segments 0 to 9FFFF indicate the conventional memory used for the DOS operating system. The 128K of memory address segments from A0000H to BFFFFH called as the A/B segment are used for video RAM. When the CPU enters the system management mode operation, this memory address segment can be used as a system management random access memory (SMRAM). The memory address segment of 64K from F0000H to FFFFFH is called the F segment and is used to provide the system BIOS to read. The memory space over 1M is called the extended memory area.

In the following paragraphs, the terms and related technicalities are defined and explained for people of ordinary skill in the art to fully understand the invention.

1. BIOS shadowing: In a general configuration process of the BIOS, a set of command to drive the processor to perform "power-on self test (POST)" is executed. The POST process comprises programs for inspecting the system RAM and the peripherals. In a part of POST process, the data in the BIOS ROM is completely copied to the system RAM. Such process is called the "BIOS shadowing". The advantage of using BIOS shadowing includes a data access time shorter than that of the BIOS ROM for the system RAM. Thus, the CPU can perform the BIOS program command quickly. Another advantage is that the data stored in the BIOS RAM is possibly in a compressed form. Therefore, the CPU can process the data after copying the data to the system RAM for decompression. In the system RAM, a part of the memory space overlapping the memory space of the BIOS ROM is used as a shadow RAM. The data of the BIOS ROM copied or shadowed to the system RAM will be decompressed (if necessary) and copied to the shadow RAM. Meanwhile, the CPU starts to execute command from the system RAM corresponding to the BIOS ROM address. It is to be noted that after the data of the BIOS memory is copied or shadowed to the system RAM, the chip enable circuit of the chipset disables the BIOS ROM. Generally speaking, the shadow RAM of the BIOS program resides in the F segment (the memory space from F0000H to FFFFFH) of the system RAM. However, when the system management interrupt event occurs, the chipset outputs a control signal SMI# to the CPU, which is then driven to enter the system management mode. When the CPU enters the system management mode operation, the SMRAM used to store the SMI handler routine indicates the A/B segment (the memory space from A0000H-BFFFFH of the system RAM). The BIOS shadow RAM and the SMRAM are the memory space decoded by using the shadow RAM control register of the chipset to control the decoder (not shown) in the chipset.

2. The BIOS I/O trap: When the power management event occurs, the OSPM does not configure the power management control command direct into the I/O address where the power management control register is. Instead, the power management control command is set in an unused specific I/O address, and an I/O trap mechanism is used to generate the I/O trap. Generally speaking, the OSPM uses the I/O address of the power management control command to be configured to set up the I/O trap address via a programmable chip select register (generally comprising two registers: programmable chip select (PCS0) and programmable chip select 1 (PCS1)). The power management control command is stored in the configured I/O address. When the OSPM configures the configuration value of the power management control commands such as the sleep type (SLP_TYP) and sleep enable (SLP_EN) in the unused I/O address, a SMI control signal is output from the chipset to the CPU, so that the CPU enters the system SMM operation. When the BIOS uses the I/O command to access the I/O addresses, the power management control command is executed to enter a specific sleep state.

Figure 3:
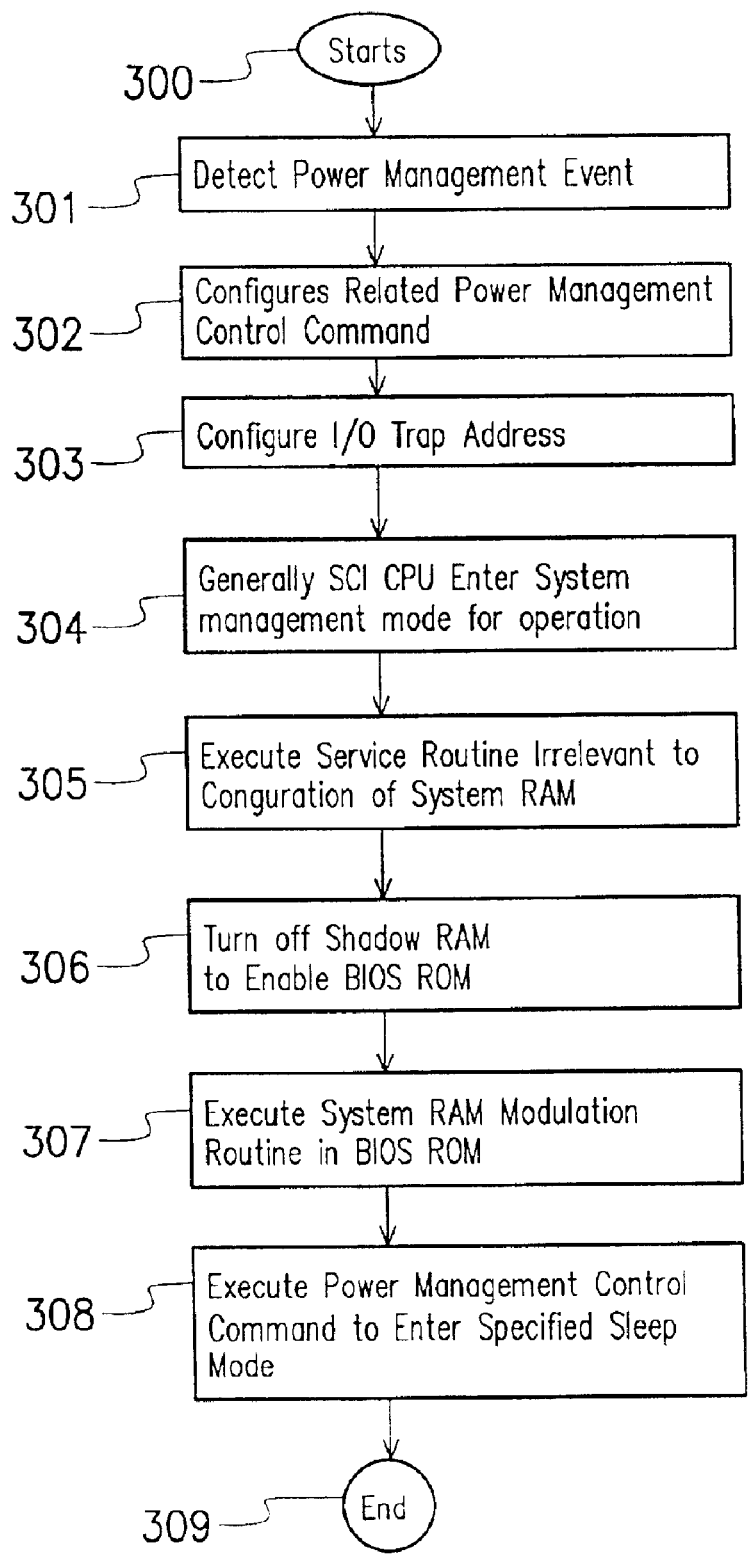
FIG. 3 and FIG. 4 show a power suspend process and a power resume process for the ACPI operating system, respectively.
Figure 4:
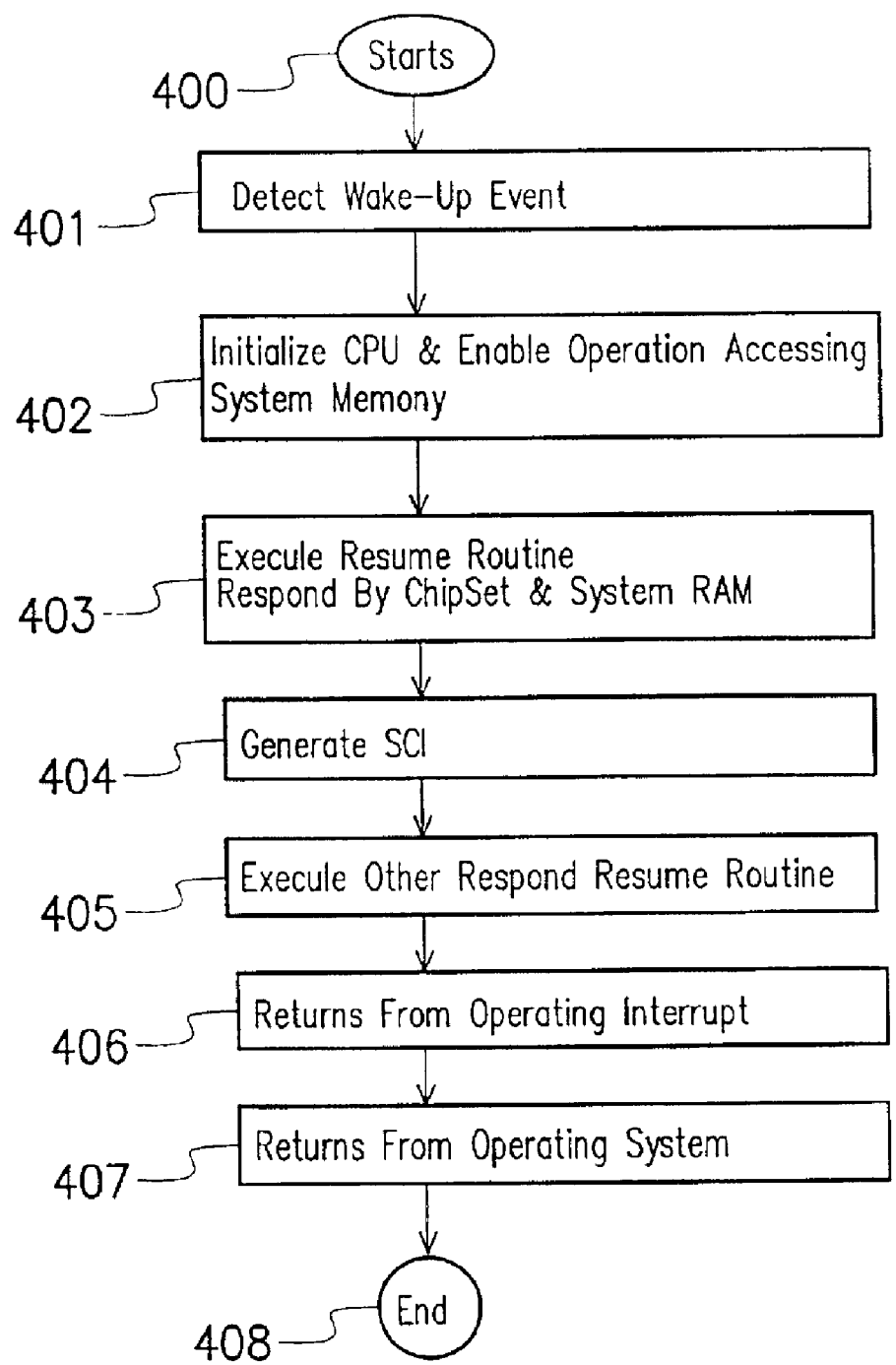

The power management routine of the invention is explained with the reference of FIGS. 3 to 6, accompanied with the system address map as shown in FIG. 2. FIG. 3 shows the power suspend routine in the ACPI process system in the invention. FIG. 4 illustrates the power resume routine in the ACPI process system in the invention. The power suspend routine of the ACPI processing system starts with step 300. In step 301, the ACPI processing system continuously detects whether any power management event occurs. In step 302, the OSPM configures the related power management control command into the unused I/O address required to be configured when one power management event occurs. In step 303, the OSPM uses the programmable chip select register (PCS0 and PCS1) to configure the I/O trap address. The BIOS can then access the I/O address with I/O mechanism, so that the power management control command can be executed to enter a specific sleep state. After configuring the I/O trap, in step 304, a SCI outputs a control signal SCI# from the chipset to the CPU, so as to drive the CPU to enter the system management mode for operation. Generally speaking, when a power management event occurs, it indicates that a hardware interrupt is initiated. The ACPI operating system uses the SCI interrupt handler to respond such event, while the legacy OS system uses SMI interrupt handler to respond such event. The ACPI operating system informs the BIOS of the occurrence of such power management interrupt event (system control interrupt event) via the system control interrupt and returns the control to the BIOS. The BIOS is then responsible for the operation of the power management process. In addition, after generating the system control interrupt, the current storage value of the data structures of the state register SR and the program counter PC are pushed to stack and save.

After the CPU outputs a confirm signal to respond the control signal SCI#, the CPU accesses the data in the SMRAM. The CPU jumps to an address of the SMRAM to execute the SCI handler routine. Further, the system control interrupt handler routine activates the SCI service routine according to the occurrence factor of the SCI. The chipset of the ACPI computer system according to the invention further comprises a decoder (not shown) and a shadow RAM control register. Normally, the BIOS will program the shadow RAM control register to decode the F segment of the system RAM as a normal BIOS program for application. The A/B segment of the system RAM is used as the SMRAM to provided to execution of the SCI service routine.

In step 305, the service routine irrelevant to the system RAM is executed at the A/B segment of the system RAM first. In step 306, the BIOS will program the shadow RAM control register of the chipset. The BIOS shadow memory of the system memory is turned off, and a ROM chip select signal ROMCS# is output to let the BIOS ROM to access data. THE BIOS will program the shadow RAM control register to enable the BIOS ROM, so as to access data from the F segment (memory space from F0000H to FFFFH) of the BIOS ROM. In step 307, a sequence of BIOS program code is used to change the frequency of the system RAM. When the shadow RAM control register enables the BIOS ROM, the interrupt service routine will distantly jump to the initial address F0000H of the F segment BIOS ROM to start executing the frequency modulation program of the system RAM. The operation frequencies of the system RAM and the CPU are thus synchronized.

After the execution of frequency modulation program of the system RAM, the BIOS access the I/O trap address previously configured in step 308. The power management control command is activated. Thus, the ACPI computer system enters the corresponding sleeping state such as the S3 sleeping state. The power suspend routine of the ACPI computer system stops at step 309.

The power resume routine of the ACPI operating system of the invention is described as follows with the illustration of FIG. 4. The power resume routine starts at step 400. In step 401, the BIOS starts executing the POST process according to the CPU's reset vector09e0n the POST process, the BIOS programs processes of the initial power on configuration, initial cache controller and memory controller, the arrangement of cache memory, the enable cache memory and memory controller, the initial chipset of the CPU. In step 403, the BIOS resumes the operation of the chipset and the system RAM via the hardware state information stored in the SMRAM. In step 404, the wake-up event drives the chipset to generate a SCI# control signal to the CPU. The CPU outputs a confirm signal to respond the control signal SCI#, and the CPU enters the SMM for operation. In step 405, all the state information of the hardware is resumed to the initial power on state in the stage of executing the system control interrupt service routine. In step 406, when the BIOS has arranged and initialize all the hardware structures, the routine returns to the BIOS program from the system control interrupt. In step 407, the BIOS program distantly jumps to the OSPM waking vector to return the control to the ACPI operating system. The power resume routine of the ACPI operating system ends at step 408.

Figure 5:
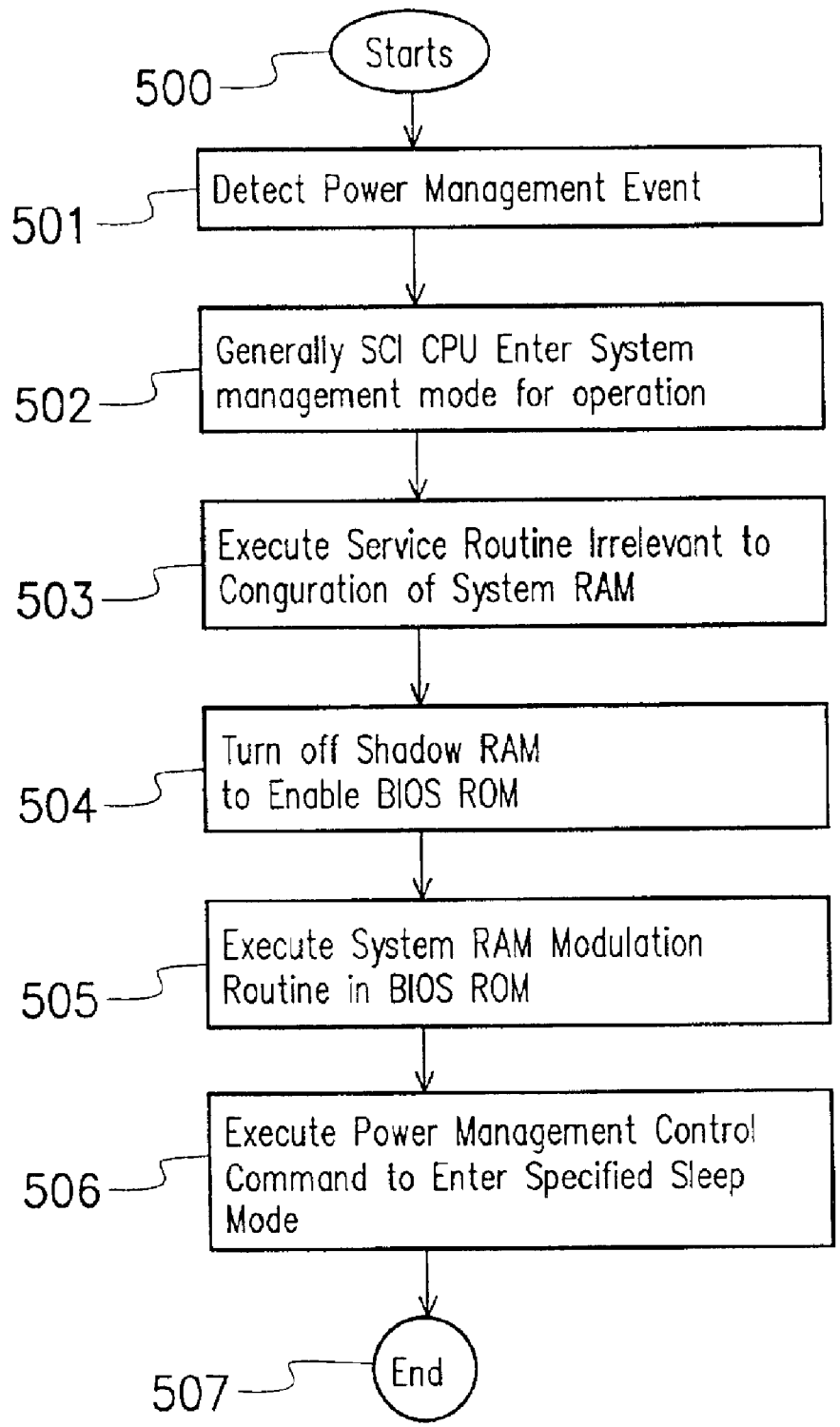
FIG. 5 and FIG. 6 show a power suspend process and a power resume process for the legacy ACPI operating system, respectively.
Figure 6:
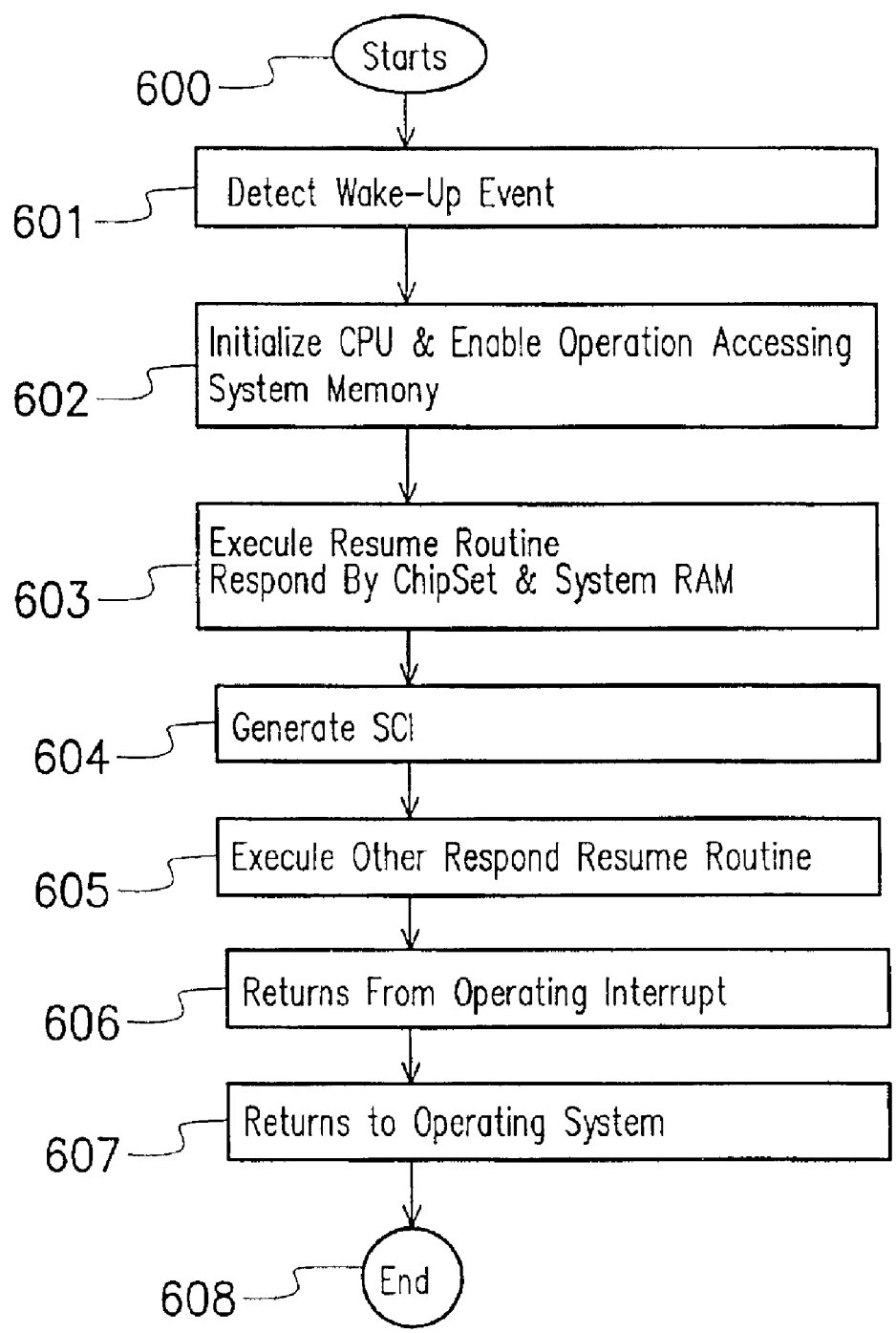

The power suspend routine and the power resume routine of the legacy APM operating system can be realized from FIGS. 5 and 6. In FIG. 5, the power suspend routine of the legacy APM operating system is shown. In step 501, a power management event is detected. In step 502, the APM operating system may generate a SMI via the software interrupt interface INT 15$h$ provided by the BIOS or the power management event (system management interrupt event). Steps 503 to 507 are similar to steps 305 to 309 in FIG. 3. Further description is not introduced here. FIG. 6 shows the power resume routine in the legacy APM operating system. The flowchart in FIG. 6 is similar to the flowchart illustrated in FIG. 4, and the introduction is not repeated.

The power management process of the invention is characterized by the service routine that synchronizes the operation frequencies of the CPU and the system RAM at a predetermined memory address segment of the BIOS ROM. Using the service routine to synchronize the operation frequencies of the CPU and the system RAM at the BIOS ROM instead of system RAM can ensure the uniqueness of the operation frequency between the system RAM and the CPU during power management process. The reliability of the BIOS under the power management process is improved to reduce the possibility of computer system down.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A power management process, to control a power state of a computer system that comprises a CPU, a chipset, a system RAM and a BIOS ROM, wherein the BIOS ROM comprises a BIOS program to initialize the computer system, the power management process comprising:

detecting whether a power management event occurs;

generating a system interrupt when the power management event occurs;

providing a first memory address segment with a memory space to the system RAM to execute a service routine of the system interrupt of the BIOS program;

driving the CPU to execute the service routine of the system interrupt irrelevant to the system RAM at the first memory address segment of the system RAM via the BIOS program;

driving the CPU to execute a service program of the system interrupt to synchronize an operation frequency of the system RAM with an operation frequency of the CPU at a memory address segment of the BIOS ROM; and executing a power management control command to drive the computer system to enter a specific sleeping state.

2. The power management process according to claim 1, wherein the computer system includes an advance configuration power interface (ACPI) computer system.

3. The power management process according to claim 1, wherein the chipset comprises a chip enable circuit controlled by the CPU to output a signal to enable the BIOS ROM.

4. The power management process according to claim 1, wherein generating the system interrupt includes outputting a system interrupt control signal from the chipset to the CPU.

5. The power management process according to claim 1, wherein before generating the system interrupt further comprises:

configuring the power management control command at a specific I/O address; and configuring an I/O trap at the specific I/O address.

6. The power management process according to claim 1, wherein the chipset further comprises a decoder to decode a plurality of memory addresses of the system RAM and a shadow RAM control register to control a decode sequence of the decoder.

7. The power management process according to claim 6, wherein executing the service routine to synchronize the operation frequencies of the CPU and the system RAM includes using the BIOS program to program the shadow RAM control register, so as to enable the BIOS ROM.

8. The power management process according to claim 1, further comprising:

detecting whether a wake-up event occurs;

initializing and arranging the CPU, the chipset and the system RAM when the wake-up event occurs;

generating a system interrupt;

driving the CPU to resume a hardware state information of the computer system via the BIOS program; and leaving the system interrupt.

9. The power management process according to claim 1, wherein the system interrupt includes a system control interrupt.

10. The power management process according to claim 2, wherein the specific sleeping state includes a S3 sleeping state.

11. A power management process, to control a power state of a computer system that comprises a CPU, a chipset, a system RAM and a BIOS ROM, wherein the BIOS ROM comprises a BIOS program to initialize the computer system, the power management process comprising:

detecting whether a power management event occurs;

using a software interrupt interface provided by the BIOS system program to generate a system interrupt when the power management event occurs;

providing a first memory address segment with a memory space to the system RAM to execute a service routine of the system interrupt of the BIOS program;

driving the CPU to execute the service routine of the system interrupt irrelevant to the system RAM at the first memory address segment of the system RAM via the BIOS program;

driving the CPU to execute a service program of the system interrupt to synchronize an operation frequency of the system RAM with an operation frequency of the CPU at a memory address segment of the BIOS ROM; and executing a power management control command to drive the computer system to enter a specific sleeping state.

12. The power management process according to claim 11, wherein the computer system includes an advance power management (APM) computer system.

13. The power management process according to claim 11, wherein the chipset comprises a chip enable circuit controlled by the CPU to output a signal to enable the BIOS ROM.

14. The power management process according to claim 11, wherein generating the system interrupt includes outputting a system interrupt control signal from the chipset to the CPU.

15. The power management process according to claim 11, wherein the chipset further comprises a decoder to decode a plurality of memory addresses of the system RAM and a shadow RAM control register to control a decode sequence of the decoder.

16. The power management process according to claim 15, wherein executing the service routine to synchronize the operation frequencies of the CPU and the system RAM includes using the BIOS program to program the shadow RAM control register, so as to enable the BIOS ROM.

17. The power management process according to claim 11, further comprising:

detecting whether a wake-up event occurs;

initializing and setting up the CPU, the chipset and the system RAM when the wake-up event occurs;

generating a system interrupt;

driving the CPU to resume a hardware state information of the computer system via the BIOS program; and withdrawing from the system interrupt.

18. The power management process according to claim 11, wherein the system interrupt includes a system management interrupt.

19. The power management process according to claim 12, wherein the specific sleeping state includes a STR sleeping state.

* * * * *